(12) United States Patent
Lee et al.

(10) Patent No.: US 6,940,623 B2
(45) Date of Patent: Sep. 6, 2005

(54) GLASS MOUNT FOR SCANNER

(75) Inventors: Ta Yi Lee, Taipei Hsien (TW); Bill Kao, Hunan (CN)

(73) Assignee: Lite-On Technology Corporation, Taipei (TW)

( * ) Notice: Subject to any disclaimer, the term of this patent is extended or adjusted under 35 U.S.C. 154(b) by 709 days.

(21) Appl. No.: 09/962,214

(22) Filed: Sep. 26, 2001

(65) Prior Publication Data

US 2003/0058483 A1 Mar. 27, 2003

(51) Int. Cl.[7] ................................................ H04N 7/04
(52) U.S. Cl. ...................................... 358/474; 358/505
(58) Field of Search ................................. 358/474, 505

(56) References Cited

U.S. PATENT DOCUMENTS

| | | | | |
|---|---|---|---|---|
| 5,724,159 | A | * | 3/1998 | Nakagawa et al. ......... 358/474 |
| 6,243,185 | B1 | * | 6/2001 | Lin et al. .................... 359/196 |
| 6,335,806 | B1 | * | 1/2002 | Chiang et al. .............. 358/474 |
| 6,377,365 | B1 | * | 4/2002 | Matsumoto ................. 358/488 |
| 6,631,014 | B1 | * | 10/2003 | Aoshima et al. ............ 358/497 |
| 6,734,996 | B1 | * | 5/2004 | Lee ............................. 358/486 |
| 2002/0149803 | A1 | * | 10/2002 | Tang et al. ................. 358/474 |
| 2004/0080797 | A1 | * | 4/2004 | Lee ............................. 358/509 |

* cited by examiner

*Primary Examiner*—Kimberly Williams
*Assistant Examiner*—Negussie Worku
(74) *Attorney, Agent, or Firm*—Rabin & Berdo, P.C.

(57) ABSTRACT

A glass mount used to mount a glass plate of a scanner is assembled on an inner surface of a top lid of the scanner. The top lid comprises at least a first lateral side, a second lateral side and a third lateral side. The first lateral side and the second lateral side are adjacent to each other and have a plurality of supportive portions to support two lateral sides of the glass plate. The third lateral side has at least one flexible portion to press on the another side of the glass plate.

8 Claims, 5 Drawing Sheets

GLASS MOUNT FOR SCANNER

FIELD OF THE INVENTION

The present invention relates to a glass mount for scanner, especially to a glass mount for desktop scanner or multifunction product (MFP), which can be easily assembled or detached to enhance yield and maintenance.

BACKGROUND OF THE INVENTION

The scanners are extensively used to scan text or graph to a computer accessible format. The document to be scanned is placed atop a glass mounted on a top lid of the scanner.

FIGS. 1 and 2 shows two kinds of prior art glass and lid assembly for scanner. The assembly comprises a top lid 1a, a glass plate 10a, and a double-side tape 11a. The top lid 1a has a flat surface defining a window 13a to form an apertured surface 14a thereon. One side of the double-side tape 11a is attached to the peripheral of one side of the glass plate 10a and another side of the double-side tape 11a is attached to the apertured surface 14a such that the glass plate 10a seals the window 13a. As shown in FIG. 1, the assembly further comprises an ornamental plate 12a attached to another side of the glass plate 10a to hide the double-side tape 11a and function as a ruler. The glass plate 10a can be attached to an outer side of the aperture surface 14a as shown in FIG. 1, or attached to an inner side of the aperture surface 14a as shown in FIG. 2.

However, the above-mentioned glass and lid assembly for scanner has complicated assembling and the use of double-side tape 11a increases cost. The glass and lid assembly requires additional pressing tool for assembling. The overall assembly is wasted if one of its components has defect. Therefore, the above-mentioned glass and lid assembly is not suitable for low end scanners.

SUMMARY OF THE INVENTION

It is the object of the present invention to provide a glass mount for scanner, which can be easily assembled or detached to enhance yield. More particular, the top lid and glass plate of the scanner can be easily and individually displaced.

To achieve above object, the present invention provides a glass mount used to mount a glass plate of a scanner and assembled on an inner surface of a top lid of the scanner. The top lid comprises at least a first lateral side, a second lateral side and a third lateral side. The first lateral side and the second lateral side are adjacent to each other and have a plurality of supportive portions to support two lateral sides of the glass plate. The third lateral side has at least one flexible portion to press on the other side of the glass plate. A bottom lid is assembled to the top lid to press the glass plate against the top lid. The glass plate can be disassembled if the flexible portion of the third lateral side no longer presses on the glass plate.

The various objects and advantages of the present invention will be more readily understood from the following detailed description when read in conjunction with the appended drawing, in which:

DETAILED DESCRIPTION OF THE INVENTION

Figure 1:
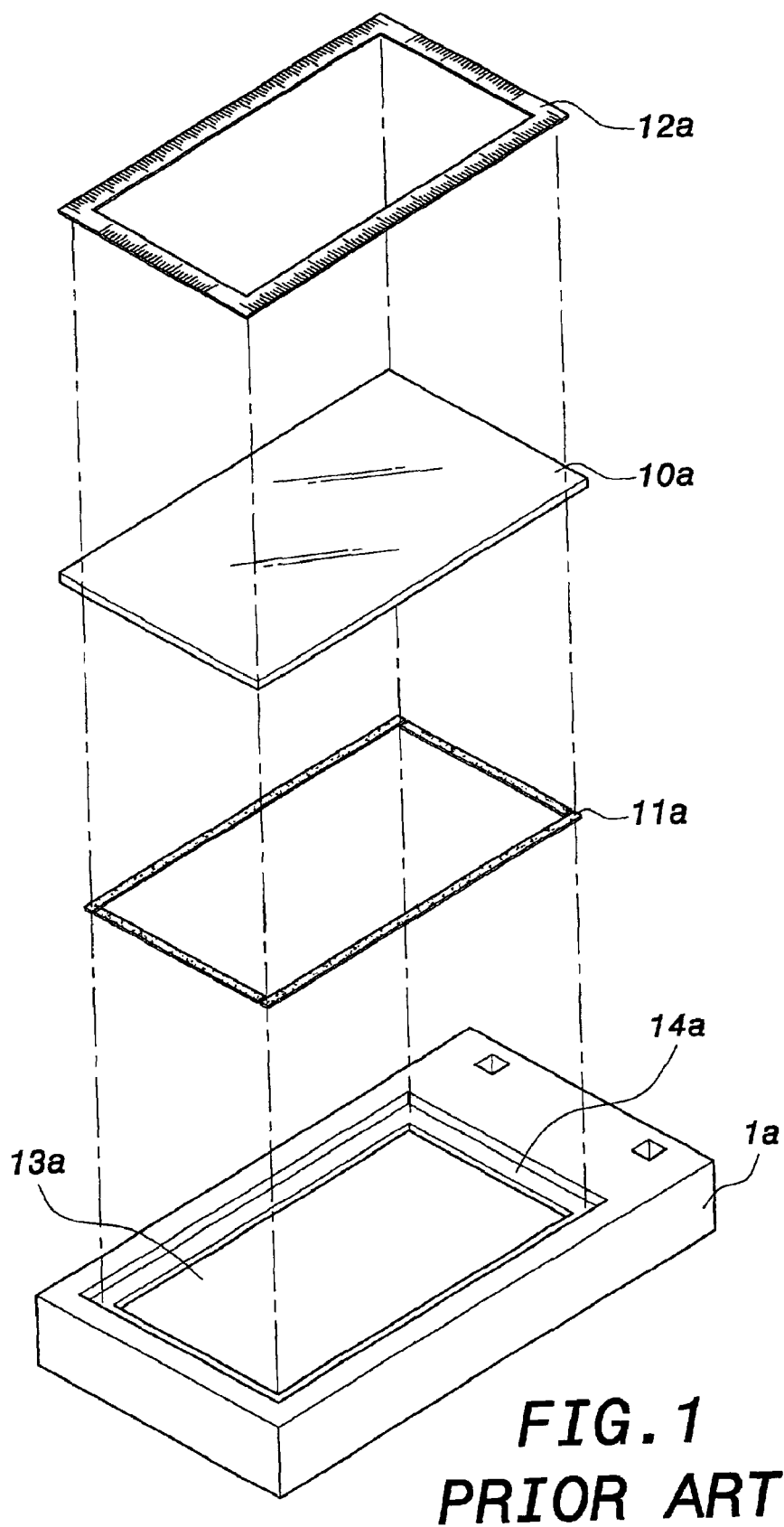
FIG. 1 shows a prior art glass and lid assembly for scanner.
Figure 2:
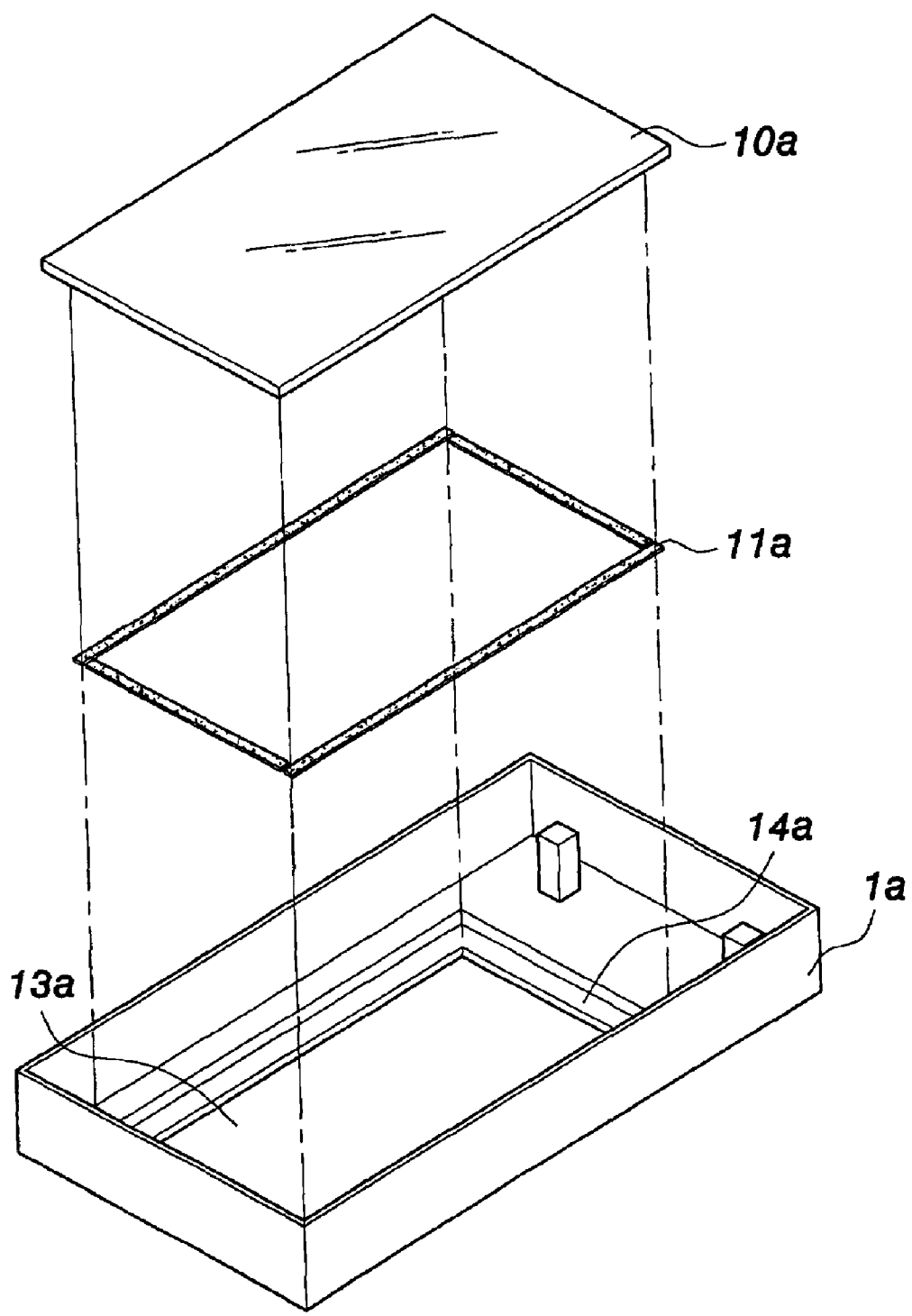
FIG. 2 shows another prior art glass and lid assembly for scanner.
Figure 3:
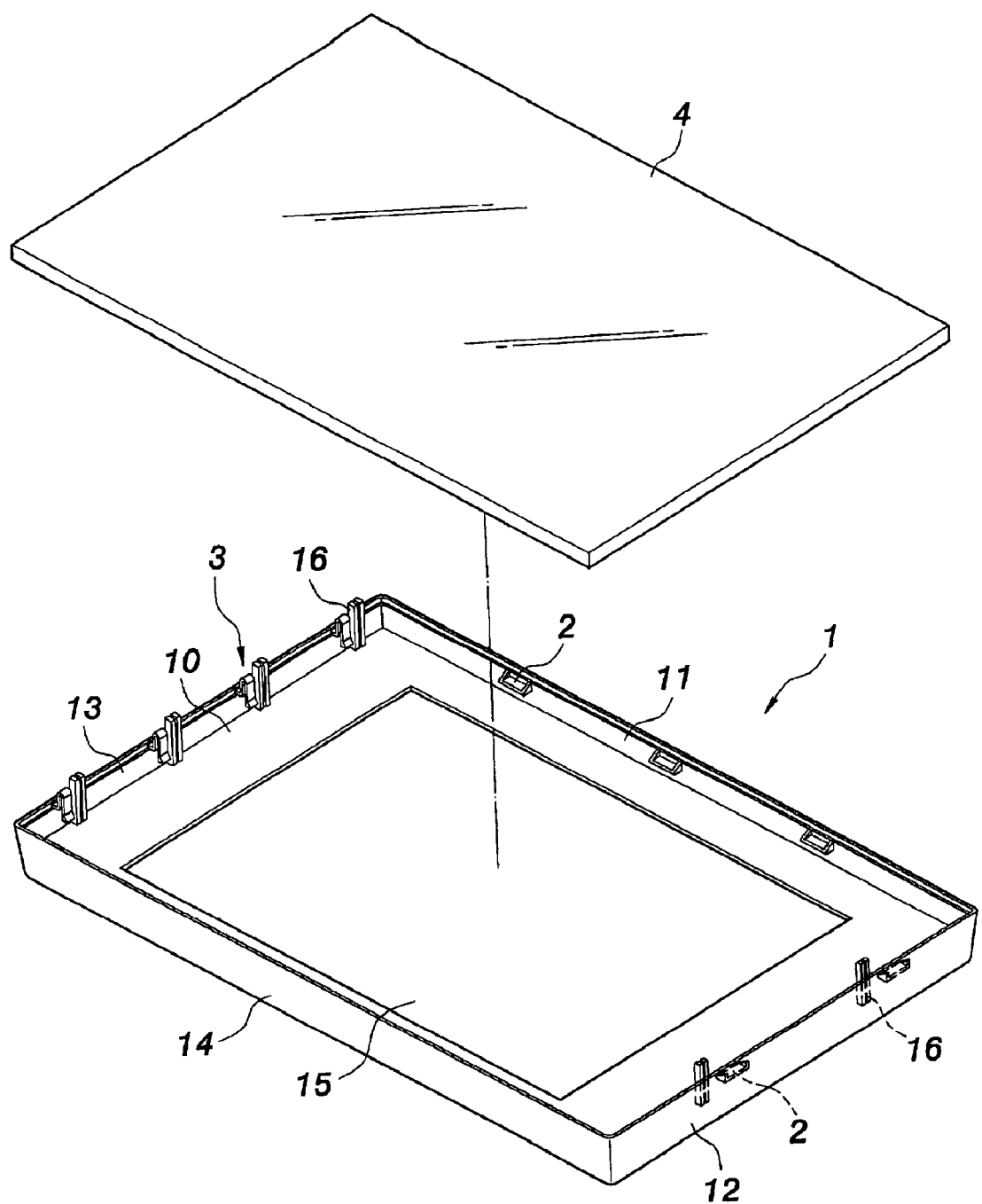
FIG. 3 shows an exploded view of the glass and lid assembly of the present invention.
Figure 4:
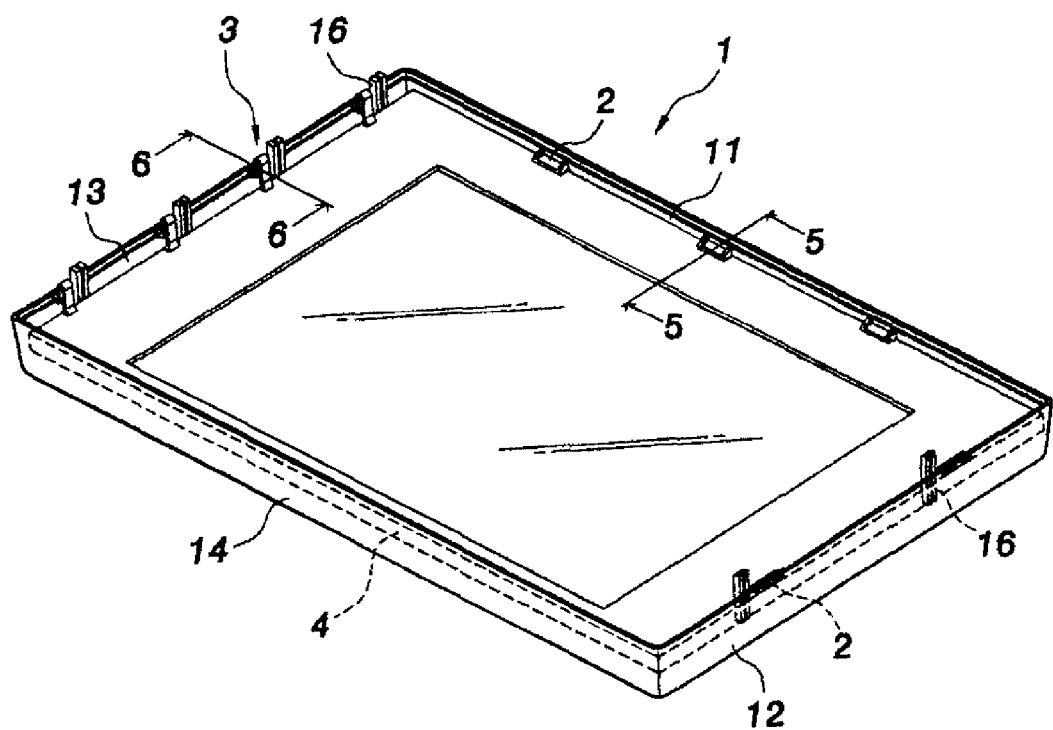
FIG. 4 shows a perspective view of the glass and lid assembly of the present invention.

As shown in FIGS. 3 and 4, the present invention provides a glass mount for scanner. The glass mount is assembled on an inner surface of the top lid 1 of the scanner and used to mount a glass plate 4. The top lid 1 comprises a flat surface 10, a first lateral side 11, a second lateral side 12, a third lateral side 13 and a fourth lateral side 14. The flat surface 10 is integrally formed with and enclosed by the four lateral sides. The flat surface 10 has a window 15.

Figure 5:
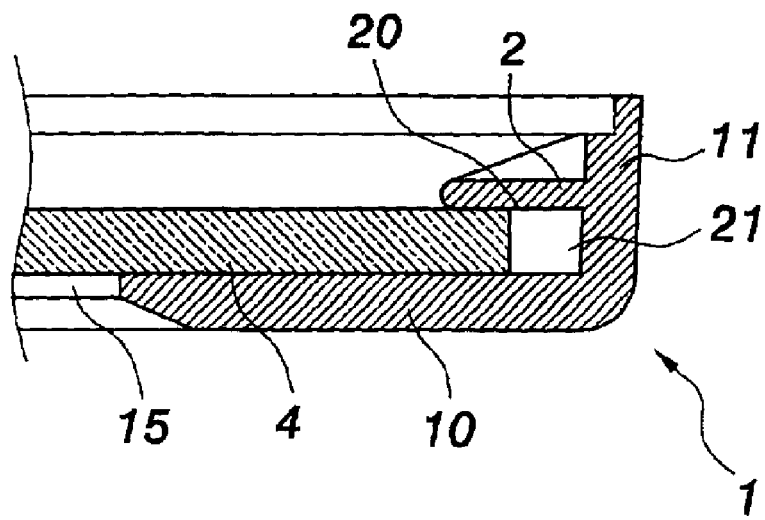
FIG. 5 shows a sectional view along line 5—5 in FIG. 4.

The first lateral side 11 and the second lateral side 12 are adjacent to each other and have a plurality of supportive portions 2, as shown in FIG. 5. The supportive portion 2 comprises a supportive plane 20 atop the flat surface 10. The supportive plane 20 and the flat surface 10 together with the first lateral side 11 (or the second lateral side 12) form a clamping groove 21 with U-shaped cross section. The clamping groove 21 has a height matched with the thickness of the glass plate 4.

Figure 6:
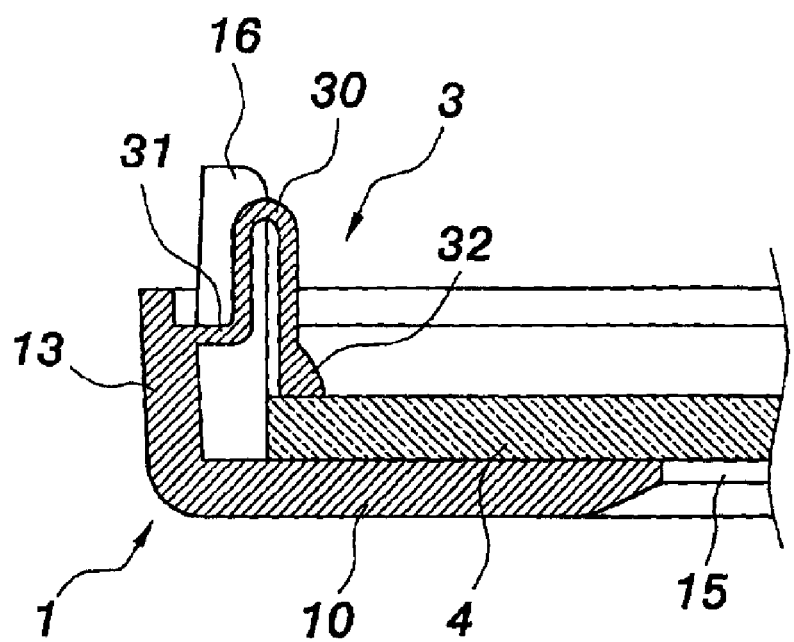
FIG. 6 shows a sectional view along line 6—6 in FIG. 4.

The third lateral side 13 (or the fourth lateral side 14) has at least one flexible portion 3, as shown in FIG. 6. The flexible portion 3 comprises a flexible segment 30, a fixing end 31 and a pressing end 32. The flexible segment 30 is of U shape and two ends thereof can be moved inward. One end of the flexible segment 30 is assembled to the third lateral side 13 through the fixing end 31 and another end of the flexible segment 30 is connected to the pressing end 32. The pressing end 32 has a separation with the flat surface 10 and the separation is smaller than the thickness of the glass plate 4.

To assemble the glass plate 4, two lateral sides of the glass plate 4 are firstly slid into the clamping grooves 21 formed on the first lateral side 11 and the second lateral side 12. Therefore, the supportive planes 20 clamp the top surface of the glass plate 4. Afterward, a remaining side of the glass plate 4 corresponding to the third lateral side 13 is pushed into a space between the flexible portion 3 and the flat surface 10. The pressing end 32 then presses on the glass plate 4 to retain the glass plate 4. Therefore, the glass plate 4 is retained to seal the window 15.

Afterward, the top lid 1 is assembled with a bottom lid (not shown) of the scanner to clamp the glass plate 4 and press the glass plate 4 on the flat surface 10.

To detach the glass plate 4, the flexible segment 30 of the flexible portion 3 is pushed inward such that the pressing end 32 no longer presses on the glass plate 4. The glass plate 4 can be easily detached from the top lid 1.

Moreover, the top lid 1 is provided with a plurality of connecting units 16 on portion thereof corresponding to the bottom lid (not shown). The connecting units 16 clamp the top lid 1 with the bottom lid after the two lids are assembled. The way for assembling the two lids is not feature of the present invention and can be achieved by many conventional approaches. Therefore, the detailed description is not stated here.

To sum up, the glass mount for scanner according to the present invention does not involve a double-side tape 11a for assembling the lid and the glass plate. The scanner can be easily assembled or detached to enhance yield and maintenance.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A support device used to support a glass plate of a scanner on an inner surface of a top lid of the scanner; the top lid comprising at least a first lateral side, a second lateral side and a third lateral side; the support device comprising:

a plurality of supportive portions respectively disposed on an inner surface of the first lateral side and an inner surface of the second lateral side for supporting two corresponding sides of the glass plate; and at least one flexible portion disposed on an inner surface of the third lateral side for pressing another side of the glass plate to abut against the top lid, when the at least one flexible portion is pressed toward the glass plate.

2. The support device as claimed in claim 1, wherein the top lid further comprises a flat surface and a fourth lateral side, the flat surface is enclosed by and integrally formed with the first lateral side, the second lateral side, the third lateral side and the fourth lateral side, and the flat surface has a window thereon.

3. The support device as claimed in claim 1, wherein the first lateral side is adjacent to the second lateral side.

4. The support device as claimed in claim 1, further comprising a clamping groove among the supportive plane, the flat surface and one of the first lateral side and the second lateral side, and the supportive portion comprises a supportive plane near the flat surface.

5. The support device as claimed in claim 4, wherein the clamping groove has U-shaped cross section.

6. The support device as claimed in claim 1, wherein the flexible portion comprises a flexible segment, a fixing end and a pressing end, and the flexible segment has one end side connected to the fixing end on the third lateral side, and another end connected to the pressing end.

7. The support device as claimed in claim 6, wherein the flexible segment has a U-shape.

8. A glass mount used to mount a glass plate of a scanner and assembled on an inner surface of a top lid of the scanner, the top lid comprising at least a first lateral side, a second later side and a third lateral side; the first lateral side and the second lateral side having a plurality of supportive portions and the third lateral side having at least one flexible portion;

the glass plate having two lateral sides supported by the supportive portions and another lateral side pressed by the flexible portion, a bottom lid assembled to the top lid to press the glass plate against the top lid;

wherein the flexible portion comprises a flexible segment, a fixing end and a pressing end, the flexible segment having one end assembled to the third lateral side through the fixing end and another end connected to the pressing end.

* * * * *